Patented Oct. 10, 1922.

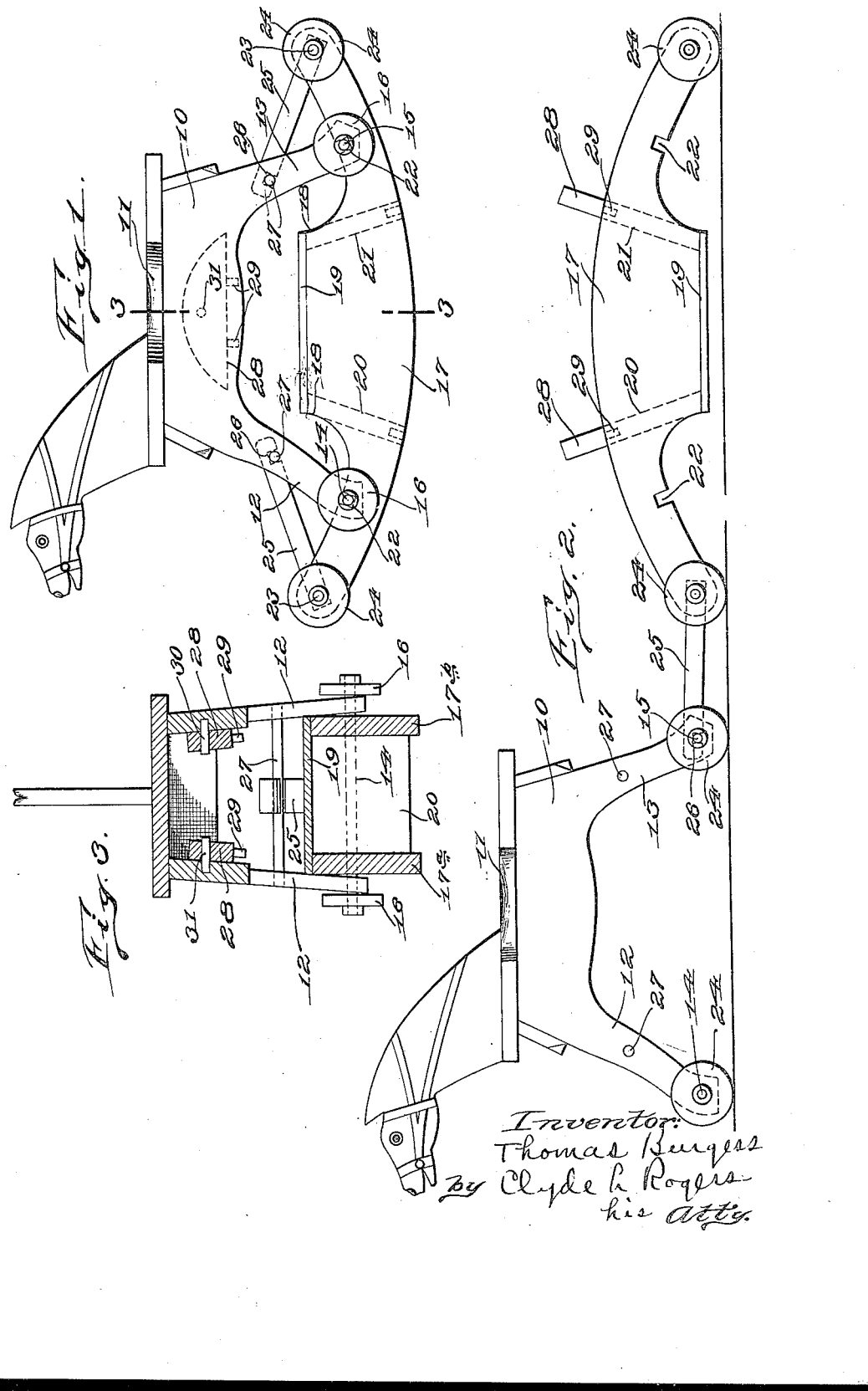

1,431,214

UNITED STATES PATENT OFFICE.

THOMAS BURGESS, OF DANVERS, MASSACHUSETTS.

CONVERTIBLE TOY HORSE.

Application filed August 23, 1921. Serial No. 494,654.

*To all whom it may concern:*

Be it known that I, THOMAS BURGESS, a citizen of the United States, and resident of Danvers, county of Essex, Commonwealth of Massachusetts, have invented an Improvement in Convertible Toy Horses, of which the following description, in connection with the accompanying drawings, is a specification, like characters on the drawings representing like parts in each of the several views.

This invention relates to toys of the hobby horse class, and more particularly to a convertible form of hobby horse that is adapted to be used also as a run-stool or child's roller car. A principal object of the invention is to provide a hobby horse of this character with means whereby the rocker base thereof may be quickly and easily detached by the child when desired, and converted for use as a trailer car that may be attached to the body of the device when it is to be used as a run-stool horse. The foregoing and other objects and advantages of the invention will more fully appear from the following detailed description, and the distinctive features of novelty will be pointed out in the appended claims.

Referring to the drawings:

Fig. 1 is a side elevation of a device embodying the invention, shown assembled for use as a rocking horse;

Fig. 2 is a similar elevation showing the rocker base converted for use as a trailer car attached to the horse body; and Fig. 3 is a transverse section on line 3—3 of Figure 1.

10 indicates the body of the horse which may be equipped with a suitable seat 11 and with front and rear pairs of legs 12, 13 arranged in spaced apart relation as usual. Each of the pairs of legs 12, 13 has fitted near the lower ends thereof, a transverse shaft or rod designated 14, 15 respectively. These shafts project somewhat from the outer sides of the legs and have fitted thereon wheels 16. A rocker base 17 is provided composed of stout side members 17ª, 17ᵇ arranged in spaced apart relation. The central portions of these side members are extended upward from the curved bottom thereof as indicated at 18, and a cover piece 19 is fitted to the tops thereof. Transverse members 20, 21 are fitted to extend between the side members 17ª, 17ᵇ at the limits of the extensions 18 thereof, these members constituting, with the member 19 and the side members, a compartment or body adapted to receive dolls or other articles when the rocker base is turned over so as to be converted for use as a trailer car as presently explained. The side members 17ª, 17ᵇ are notched as indicated at 22 to receive the shafts 14, 15 and the extremities of these side members have fitted thereto, shafts 23 which project somewhat from the sides thereof and serve as mountings for wheels 24, which are preferably of a dimension similar to the wheels 16. The shafts 23 have pivoted thereto between the rocker members 17ª, 17ᵇ bars 25, the outer ends of which are notched at their inner sides as indicated at 26, and adapted to engage over pins 27 secured to the legs of the horse body intermediate the height thereof. With this construction it will be noted that the horse body 10 may be applied to the rocker base 17 with the shafts 14, 15 seated in the notches 22, and upon swinging the bars 25 so that the notches 26 thereof engage over the pins 27, the horse body is firmly and securely engaged with the rocker base, yet with a capability of instant and easy removal without any other manipulation than merely swinging back the bars 25 and lifting off the horse body. When it is desired to use the horse body as a run horse, it is thus removed from the rocker base, and the rocker base may then be inverted as indicated in Figure 2. Thereupon one of the bars 25, may be swung outward so that the notch 26 thereof will engage over an intermediate portion on the shaft or rod 15 at the base of the rear legs of the horse, to couple the trailer car thus constituted to the horse body and permit it to be drawn along as the child propels the horse body with his feet as he sits thereon; or the trailer car may be used in other ways by the child without attachment to the horse body. When the rocker base is converted for use as a car, it will be observed that the transverse members 20, 21 serve as seat backs for dolls or the like, they being for this purpose preferably mounted in sloping relation as shown. To further add to the attractive appearance and use of the car thus constituted, I preferably provide members 28 adapted to be fitted upon the tops of the members 20, 21 and constituting higher seat backs. These members may be provided with pins 29 fitting into sockets in the tops of the members 20, 21 and when the device is assembled as a rocking horse these members may be housed inside of the body 10, which for this purpose is provided with inwardly extending pins 30, upon which these members may be hung, having for this purpose holes 31 to receive said pins. I am aware that the invention may be embodied in other specific forms without departing from the spirit or essential attributes thereof, and I therefore desire the present embodiment to be considered in all respects as illustrative and no restrictive, reference being had to the appended claims rather than to the foregoing description to indicate the scope of the invention.

Having described my invention, what I claim as new and desire to secure by Letters Patent is:

1. A convertible rock and run-stool horse comprising a body equipped with wheels at its bottom, and a rocker base to which said body is detachably fitted also equipped with wheels at its extremities, arranged for said base to rest thereon when inverted, said base equipped also with a seat and adapted to serve when inverted as a car.

2. A convertible rock and run-stool horse comprising a body having wheels at its bottom, a rocker base having wheels at its extremities and to which said body is detachably fitted, said base equipped with swinging bars adapted to lock the body thereto, and having a seat adapting it to serve when inverted as a trailer car, one of said bars serving then to connect the car with the horse body.

3. A device of the kind described comprising a body equipped with a seat, a rocker base equipped with wheels and to which said body is detachably fitted, said rocker base being equipped with a compartment space at an intermediate portion thereof and adapted to serve as a car when inverted.

4. A convertible rock and run-stool horse having wheels at the base thereof, and a detachable rocker base also having wheels at its extremities on which it is adapted to rest when inverted, said base constructed and arranged to serve also as a trailer car at will.

In testimony whereof, I have signed my name to this specification.

THOMAS BURGESS.